United States Patent
Hara et al.

(10) Patent No.: US 8,694,705 B2
(45) Date of Patent: Apr. 8, 2014

(54) INFORMATION PROCESSING DEVICE

(75) Inventors: Hirotaka Hara, Kanagawa (JP);
Tatsuya Kamei, Kanagawa (JP);
Takahiro Irita, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 185 days.

(21) Appl. No.: 13/170,179

(22) Filed: Jun. 27, 2011

(65) Prior Publication Data
US 2011/0320660 A1 Dec. 29, 2011

(30) Foreign Application Priority Data
Jun. 28, 2010 (JP) ................................. 2010-146141

(51) Int. Cl.
*G06F 13/36* (2006.01)
*G06F 12/00* (2006.01)

(52) U.S. Cl.
USPC ........... 710/113; 710/107; 710/114; 710/116; 710/240

(58) Field of Classification Search
USPC ................... 710/107–114, 240–244
See application file for complete search history.

(56) References Cited

U.S. PATENT DOCUMENTS

| | | | | |
|---|---|---|---|---|
| 6,782,441 | B1 * | 8/2004 | Nguyen et al. ................ | 710/240 |
| 6,848,017 | B2 * | 1/2005 | MacEachern et al. ........ | 710/317 |
| 6,978,329 | B1 * | 12/2005 | Harral ........................... | 710/116 |
| 7,451,249 | B2 * | 11/2008 | Cowan et al. ................. | 710/22 |
| 7,529,861 | B2 * | 5/2009 | Ohta et al. ..................... | 710/8 |
| 7,606,957 | B2 | 10/2009 | Furuzono | |
| 7,707,342 | B2 * | 4/2010 | Horisaki ...................... | 710/244 |
| 7,743,192 | B2 * | 6/2010 | Wei et al. ...................... | 710/244 |
| 7,908,416 | B2 * | 3/2011 | Kato et al. .................... | 710/113 |

FOREIGN PATENT DOCUMENTS

| | | | |
|---|---|---|---|
| JP | 4-250523 | A | 9/1992 |
| JP | 7-134689 | A | 5/1995 |
| JP | 2007-41771 | A | 2/2007 |
| JP | 2007-219925 | A | 8/2007 |
| JP | 2008-40650 | A | 2/2008 |

OTHER PUBLICATIONS

Office Action mailed Jan. 30, 2014, in Japanese Patent Application No. 2010-146141.

* cited by examiner

*Primary Examiner* — Brian Misiura
(74) *Attorney, Agent, or Firm* — Miles & Stockbridge P.C.

(57) ABSTRACT

To improve processing performance of an information processing device as a whole by controlling priority in units of processes. There are provided a bus for data transfer and a plurality of function modules each having a processing function performing processing in units of processes and capable of issuing a data transfer request for the bus. Further, there is provided a process identification information holding unit capable of holding process identification information set for each of the processes in association with the function module performing processing of the process. Furthermore, there is provided a bus arbiter determining a priority order of processing for each piece of the corresponding process identification information for each data transfer request from the function module and arbitrating contention of data transfer requests for the bus according to the priority order. Processing performance is improved by performing priority order control in units of processes.

3 Claims, 9 Drawing Sheets

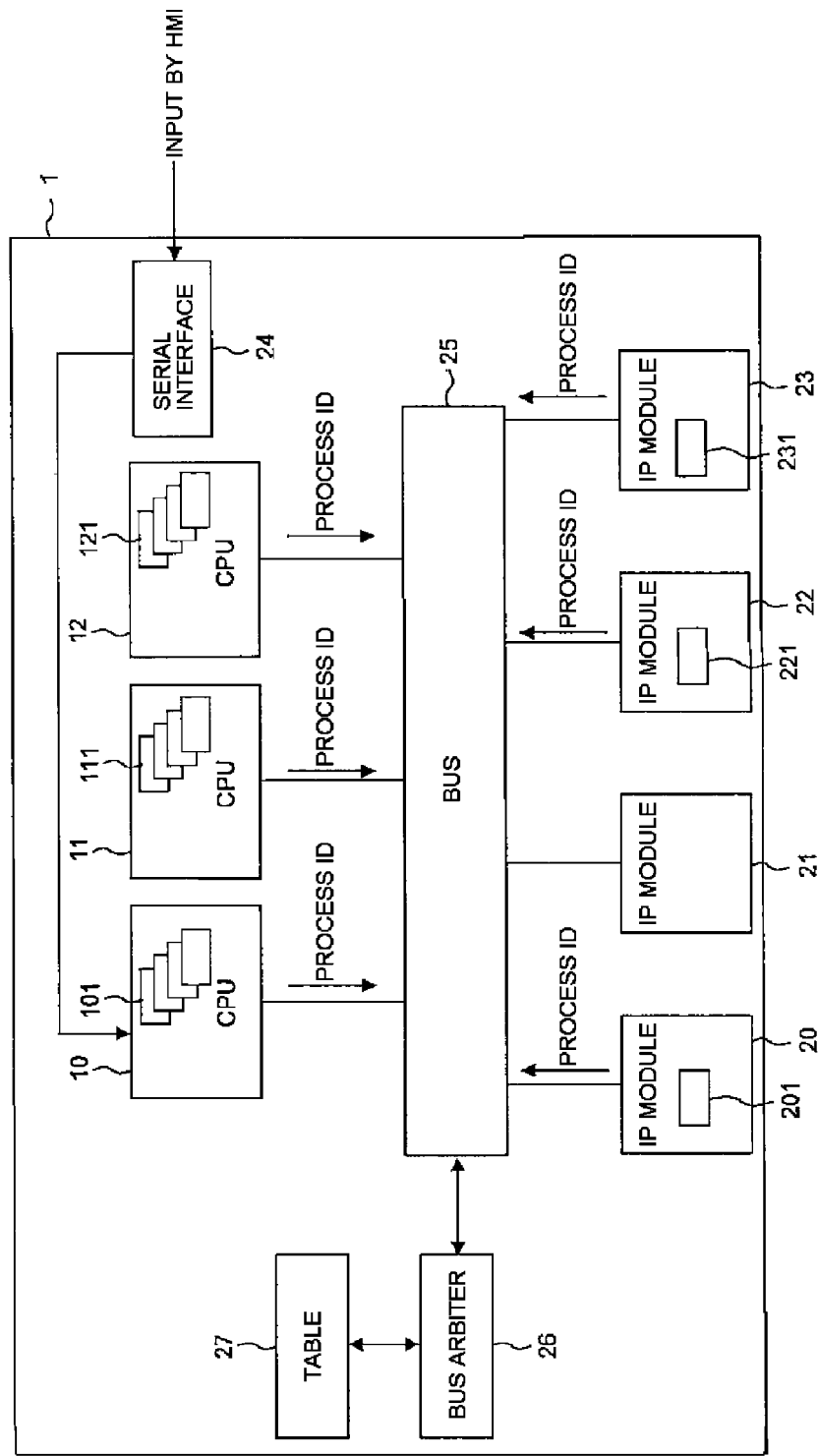

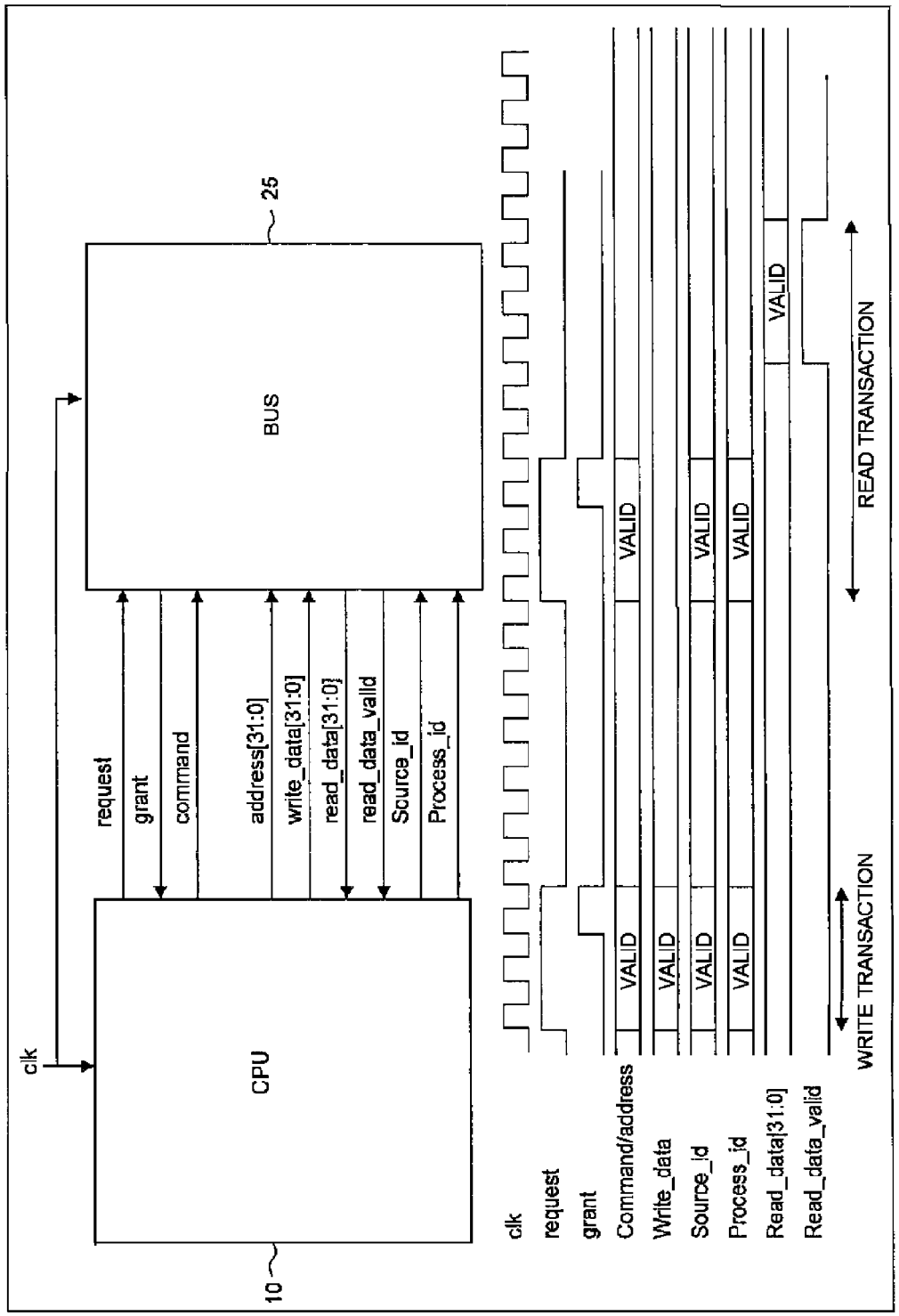

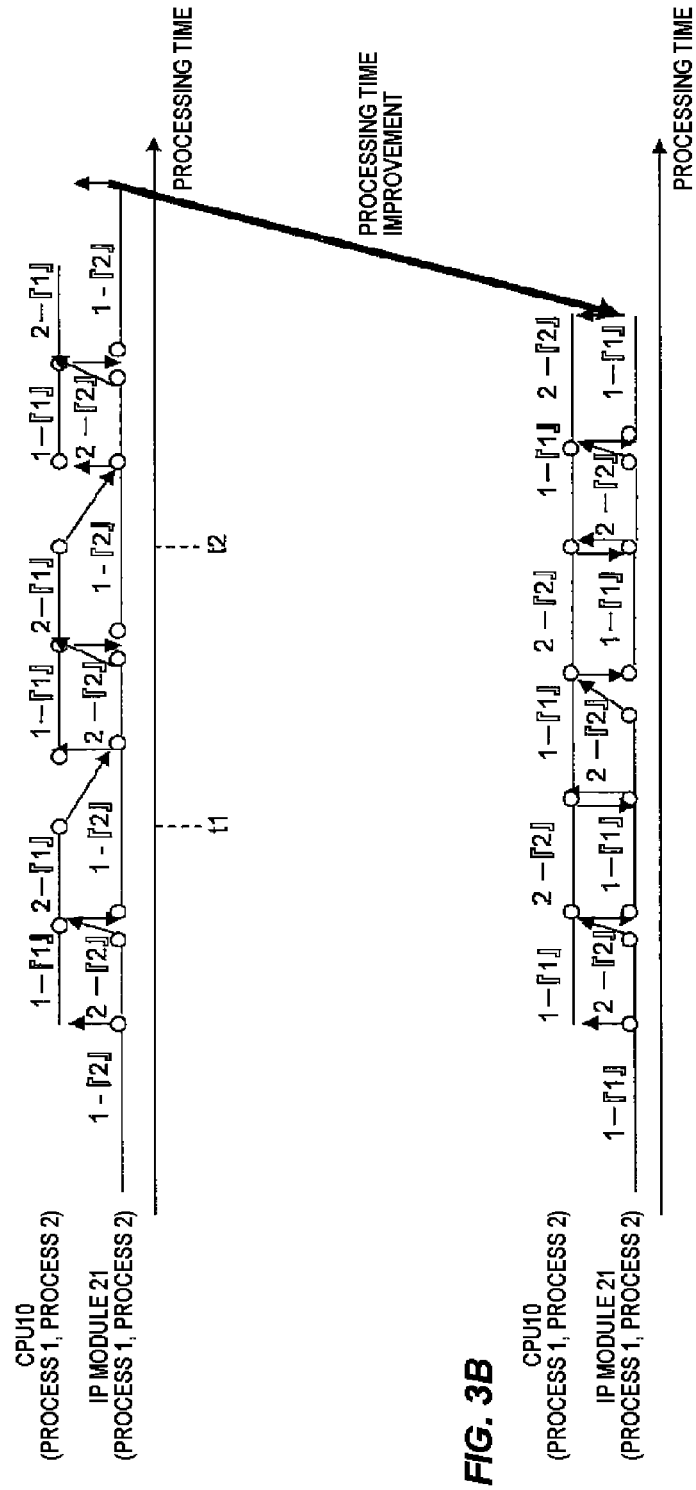

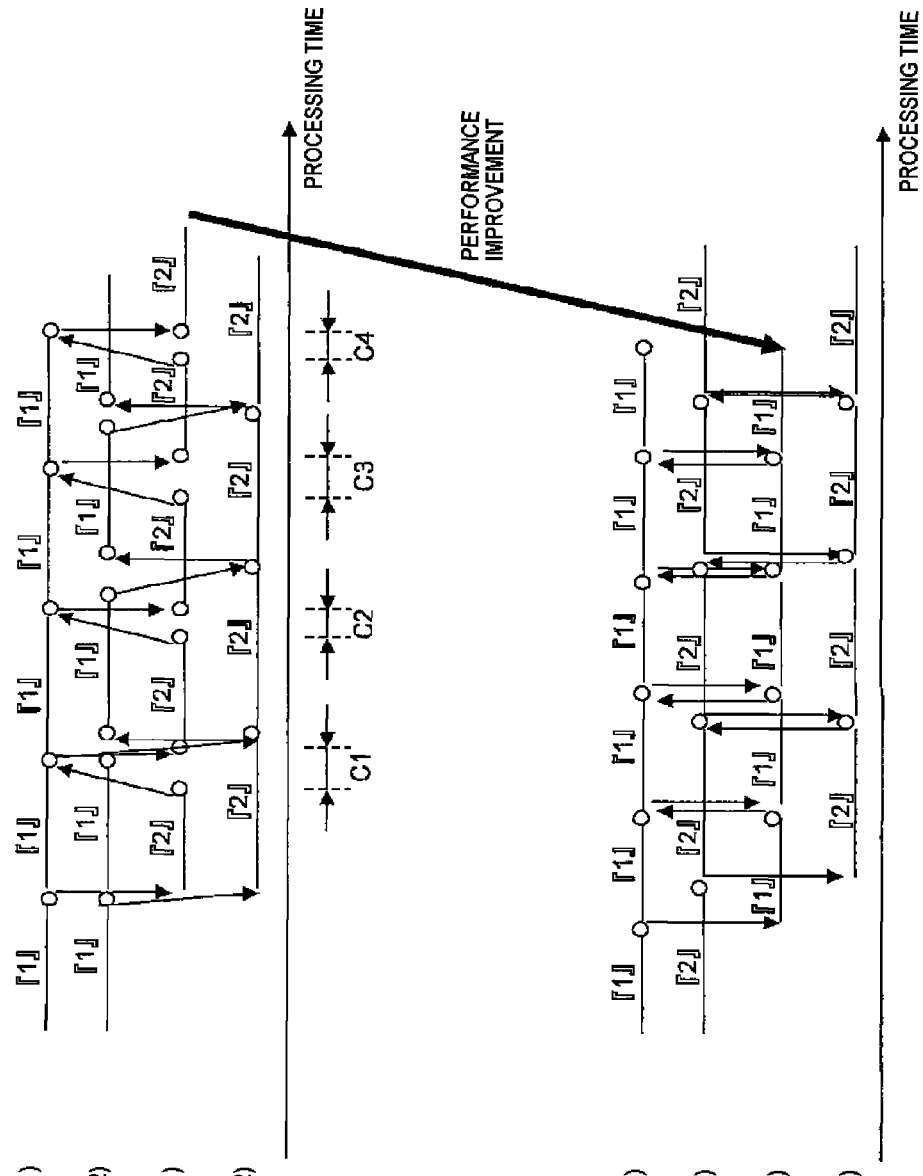

*FIG. 8*

| | | |
|---|---|---|
| CPU10 | 0x0001 | ⎫ 101 |
| | 0x0002 | |
| CPU11 | 0x0001 | ⎫ 111 |
| | 0x0003 | |
| IP MODULE 20 | 0x0001 | ⎫ 201 |
| | 0x0003 | |
| IP MODULE 22 | 0x0004 | ⎫ 211 |
| IP MODULE 23 | 0x0005 | |

INFORMATION PROCESSING DEVICE

CROSS-REFERENCE TO RELATED APPLICATIONS

The disclosure of Japanese Patent Application No. 2010-146141 filed on Jun. 28, 2010 including the specification, drawings and abstract is incorporated herein by reference in its entirety.

BACKGROUND

The present invention relates to bus arbitration technology in an information processing device, and relates to technology effective when applied to, for example, a microcomputer (also referred to as microprocessor or data processor).

Patent Document 1 (Japanese Patent Laid-Open No. 1995-134689) describes technology to improve immediate responsiveness in bus arbitration. According to the technology, the bus arbiter and the unit coupled to the shared bus are coupled by a signal line and when there is a bus contention, a unit to be granted the use of the bus is determined based on the priority information sent to the signal line. By the bus arbiter itself being coupled to the shared bus, updating of information of priority order from the processor unit is enabled.

Patent Document 2 (Japanese Patent Laid-Open No. 2008-40650) describes technology to improve the performance of a system. According to the technology, in the bus arbitration device performing arbitration of access requests to the shared resource by a plurality of requestors via the shared bus, at least one of the requestors outputs an internal status signal to notify that the priority order of the access request by the requestor should be changed in accordance with the internal status. Then, the bus arbitration device performs arbitration of the access requests based on the internal status signal.

Patent Document 3 (Japanese Patent Laid-Open No. 2007-41771) describes technology to improve the unevenness of the use efficiency of the bus bandwidth. According to the technology, in the memory scheduler, the memory access totalization unit totalizes the use efficiency of the bus for each process ID from the memory access command and the bus use efficiency comparison unit compares the totalization result of the memory access totalization unit with the threshold value set in the threshold value setting unit. In accordance with the comparison result, the memory scheduler interrupts the process scheduler. The process scheduling change unit receives the interrupt from the memory scheduler and changes the process scheduling condition of the CPU core from the priority of the process to the use efficiency of the bus of the process.

Patent Document 4 (Japanese Patent Laid-Open No. 1992-250523) describes technology to increase the priority order of the process by software by selecting a specific window on the screen specified by a user.

SUMMARY

The inventors of the present invention have examined the application of the conventional bus arbitration technology to an SoC (System-on-chip) and found that there is a possibility that the bus crashes for the following reasons.

(1) "Multi CPU" as referred to herein uses a plurality of CPUs (Central Processing Units). In a high-performance SoC mounting the multi CPU and AV (audio/visual) system IP, the bus bandwidth of the main storage memory (DDR (Double-Data-Rate) memory etc.) is not sufficient and if all the real-time IPs are operated at the same time, there is a possibility that the bus crashes. Here, "IP (Intellectual Property)" refers to partial circuit information to constitute LSI (Large Scale Integration), grouped in units of functions.

(2) In the individual application operations in (1) described above, the configuration is such that a plurality of IPs and CPUs operate in a cooperative manner and further IP or CPU is demanded real-time operations or the maximum operations depending on the kind of application, and thus, the operations change in various ways.

(3) In (1) described above, the configuration is such that CPU, GPU (Graphics Processing Unit), the video processing unit, etc., can execute a plurality of processes in a parallel manner, and the priority order of the bus differs in units of processes, not in units of CPU or IP. Here, the "process" is a unit of processing in a microcomputer, corresponding to software in conformity with the application of a user. Specifically, mention is made of playback of media player, route search in car navigation, etc. Such application software is activated by the input operation (this corresponds, for example, to the operation to touch a touch panel type display, the operation to press a button, and the change in the external environment (this is caused by various factors as to the route search in car navigation, such as that GPS capture information is updated and traffic information or traffic jam information is updated)) from HMI (Human Machine Interface). Once the application is activated, CPU and IP perform processing in cooperation to execute the processing. For example, in the playback operation of media player, processing of a search of database, file conversion into a format that can be input to IP, synchronization processing of Audio/Video by CPU, decode of video data by Video IP, and decode of audio data by Audio IP are performed as a pipeline operation. Consequently, the operation efficiency of CPU, Video IP, and Audio IP described above is improved when the same priority order is given when acquiring the bus right, however, on the contrary, if higher priority is given to one of them, the processing by another IP is held in abeyance, and as a result, it can be thought that the processing performance is reduced as a whole.

(4) Further, in the conditions in (1) described above, it is required to control the bus priority in accordance with the change in the priority order of the application corresponding to the input from HMI. However, Patent Documents 1 to 4 do not consider the change of the bus priority according to the request from HMI.

It can be thought to determine the emergency level by determining the kind of data to transfer according to the attributes of the processing program issuing the transfer request or information about the storage position of transfer data. However, even in the same program, there is processing of different emergency level depending on the application and the emergency level cannot be determined only from the program. For example, in the operation of a screen synthesis engine, the real-time level of the request is high for the operation including a reproduction image of a motion picture, however, when an image close to a still image, such as a menu screen, is dealt with, the real-time level is reduced. Alternatively, a method can be conceived of, in which the timer function possessed by IP is used to promote data processing for a fixed period of time and when the progression becomes slow, the emergency level is increased, however, the above-mentioned problems cannot be solved even by such a method.

The present invention has been made in view of the above circumstances and provides technology to improve the processing performance of an information processing device as a whole by controlling priority in units of processes.

The other purposes and the new feature of the present invention will become clear from the description of the present specification and the accompanying drawings.

The following explains briefly the outline of a typical invention among the inventions disclosed in the present application.

That is, there are provided a bus for data transfer and a plurality of function modules each having a processing function to perform processing in units of processes and capable of issuing a data transfer request for the bus. Further, there is provided a process identification information holding unit capable of holding process identification information set for each process in association with the function module performing processing of the process. Furthermore, there is provided a bus arbiter determining the priority order of the processing for each corresponding process identification information for each data transfer request from the function module and arbitrating the bus contention of the data transfer requests for the bus according to the priority order.

The following explains briefly the effect acquired by the typical invention among the inventions disclosed in the present application.

That is, it is possible to provide technology to improve the processing function of an information processing device as a whole by controlling priority in units of processes.

BRIEF DESCRIPTION OF THE DRAWINGS

FIG. 1 is a block diagram of a configuration example of a microcomputer regarded as an example of an information processing device according to the present invention;

FIG. 2 is an explanatory diagram of signals exchanged between an IP module and a bus in the microcomputer shown in FIG. 1;

FIG. 3 is a diagram for explaining a relationship between processing in CPU and processing in IP module (DDR controller) in FIG. 1;

FIG. 4 is a diagram for explaining a relationship between processing in CPU and IP module (DDR controller and PCI express) in FIG. 1;

FIG. 8 is an explanatory diagram of a setting example of a process ID setting register in the microcomputer shown in FIG. 1.

DETAILED DESCRIPTION

1. Outline of Embodiments

Figures 5A, 5B:
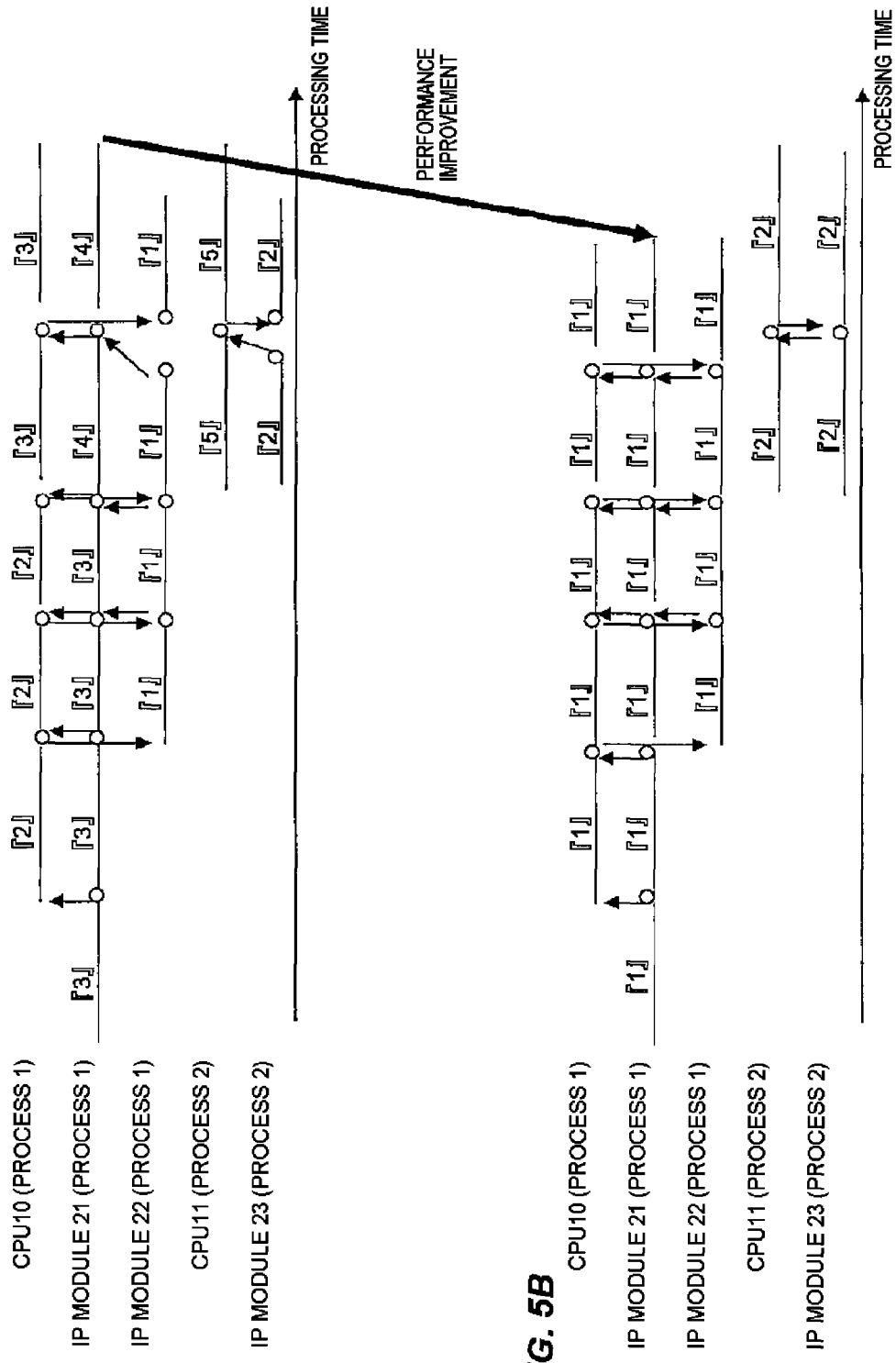
FIG. 5 is a diagram for explaining a relationship between processing in CPU and IP module (DDR controller, PCI express, MPEG video decoder) in FIG. 1.

First, the outline of typical embodiments of the present invention disclosed in the present application is explained. In the explanation of the outline of typical embodiments, reference symbols with brackets in the drawings referred to merely illustrate those included in the concept of the components to which the reference symbols are attached.

[1] An information processing device (1) according to a typical embodiment of the present invention includes a bus (25) for data transfer and a plurality of function modules (10, 11, 12, 20, 22, 23) each having a processing function to perform processing in units of processes and capable of issuing a data transfer request for the bus. Further, the information processing device (1) further includes a process identification information holding unit (101, 111, 121, 201, 221, 231) capable of holding process identification information (process identification ID) set for each of the processes in association with the function module to perform processing of the process. Furthermore, the information processing device (1) includes a bus arbiter (26) determining the priority order of processing of each corresponding process identification information for each data transfer request from the function module and arbitrating contention of data transfer requests for the bus according to the priority order. The function module includes CPU and an IP module. An IP module refers to a module provided by IP (Intellectual Property).

According to the configuration described above, in accordance with the process identification information output from the process identification information holding unit, the priority order in the arbitration of the contention of transfer requests from the function module is determined. Due to this, the priority order can be controlled in units of processes, and therefore, it is possible to perform priority order control in a device in conformity with multiprocess or a device that performs processing of a plurality of processes. The priority order control in units of processes can be performed quickly because it is not necessary to confirm the processing status in other function modules. By such processing, it is possible to improve the processing performance of the information processing device as a whole.

[2] In [1] described above, the function modules include a CPU. It is possible to constitute the CPU so as to set process identification information corresponding to a process for the process identification information holding unit corresponding to the function module used in the processing of the process before activating the process. By constituting the CPU as above, it is possible to smoothly perform the priority order control in units of processes.

[3] In [2] described above, to the process identification information holding unit, a register can be applied. The register can be arranged within each of the function modules. Due to this, read and write of the process identification information can be performed at high speed.

[4] In [3] described above, a table in which the process identification information and the priority order are associated can be provided. In this case, it is possible to constitute the bus arbiter so as to change the priority order of the use of the bus by referring to the table. Due to this, it is possible to easily change the priority order of the use of the bus by referring to the table.

[5] in [4] described above, in the table, stored information can be updated. Due to this, it is possible to smoothly perform the priority order control in units of processes according to the change in circumstances.

[6] In [5] described above, it is possible to constitute the CPU so as to change the priority order based on an external input. Due to this, it is possible to easily change the priority order according to an external input. The external input can be an input by HMI (Human Machine Interface). In this case, it is possible to constitute the input signal by HMI so that the processing thereof can be performed as an interrupt for OS (Operating System) to be executed by CPU.

[7] In [6] described above, the bus can be a split transaction type bus. At this time, the process identification information is supplied to the bus arbiter by a sideband signal of the bus in a cycle in which a grant signal for a data transfer request from the function module is asserted. The sideband signal is an already existing signal of the split transaction type bus, and therefore, it is not necessary to newly provide a signal to transfer process identification information by utilizing the sideband signal.

[8] Another information processing device (1) according to a typical embodiment of the present invention includes a bus (25) for data transfer and a plurality of function modules (10, 11, 12, 20, 22, 23) each having a processing function to perform processing in units of processes and capable of issuing a data transfer request for the bus. Further, the information processing device (1) includes a priority information holding unit (102, 112, 122, 202, 222, 232) capable of holding priority information set for each of the processes in association with the function module performing processing of the process and a bus arbiter (26) arbitrating contention of data transfer requests for the bus according to the priority order based on the corresponding priority information for each data transfer request from the function module. It is possible for the bus arbiter to perform priority order control in the arbitration of the contention of data transfer requests from the function module according to the priority information output from the priority information holding unit. With this configuration, the priority order of the use of the bus can be changed according to the priority information output from the priority information holding unit, and therefore, it is possible to obtain the same effect as that in [1] described above.

[9] In [8] described above, the function modules include a CPU. It is possible to constitute the CPU so as to set priority information corresponding to a process for the priority information holding unit within the function module used to perform processing of the process before activating the process to aim at smoothing of processing. By doing so, it is possible to smoothly perform priority order control in units of the processes.

[10] In [9] described above, to the priority information holding unit, a register can be applied. Due to this, it is possible to perform read and write of priority information at high speed.

[11] In [10] described above, the bus can be a split transaction type bus. In such a case, it is possible to constitute the priority information so as to be supplied to the bus arbiter by a sideband signal of the bus in a cycle in which a grant signal for a data transfer request from the function module is asserted. The sideband signal is an already existing signal of a split transaction type bus, and therefore, it is not necessary to newly provide a signal to transfer process identification information by utilizing the sideband signal.

2. Details of Embodiments

Embodiments are described in more detail.

First Embodiment

FIG. 1 shows a configuration example of a microcomputer regarded as an example of an information processing device according to the present invention.

Although not limited in particular, a microcomputer 1 shown in FIG. 1 is an Soc (System-on-a-chip) and formed on a single semiconductor substrate, such as a single crystal silicon substrate, by the publicly-known semiconductor integrated circuit manufacturing technology. The microcomputer 1 includes a plurality of function modules coupled to a bus 25. Here, the function module refers to a part that can be easily added and removed and which has a certain group of functions. Such a function module includes CPUs (Central Processing Unit) 10, 11, 12 and IP modules 20, 21, 22, 23. Here, the IP modules 20, 21, 22, 23 refer to modules provided by IP (Intellectual Property). The CPUs 10, 11, 12 and the IP modules 20, 21, 22, 23 are coupled to one another via the bus 25.

The CPUs 10, 11, 12 each perform predetermined arithmetic processing. In the CPUs 10, 11, 12, process ID registers 101, 111, 121 are each provided as a storage unit to store process identification information (referred to as "process ID"). Here, a "process" is a unit of processing in a microcomputer, corresponding to software in conformity with an application of a user. Specifically, mention is made of playback of media player, route search in car navigation, etc. Such application software is activated by the input operation (this corresponds, for example, to the operation to touch a touch panel type display, the operation to press a button, and the change in the external environment (this is caused by various factors as to the route search in car navigation, such as that GPS capture information is updated and traffic information or traffic jam information is updated)) from HMI (Human Machine Interface). Once the application is activated, the CPU and IP module perform processing in cooperation to execute the application. The number of process ID registers within each CPU corresponds to the number of processes to be performed at the same time. To the CPU 10, an input signal by HMI (Human Machine Interface) is transmitted via a serial interface 24. The processing of the input signal by HMI is performed as an interrupt to OS (Operating System) to be executed by the CPU 10. As an input signal by HMI, mention is made of a signal input to the microcomputer 1 by the operation to touch a touch panel type display, the operation to press a button, a change in external environments, etc.

The IP module 20 functions as, for example, a graphics device interface and in charge of processing, such as drawing of a straight line or curve, (computer) rendering of a font, and control of a pallet. The IP module 21 functions as, for example, a DDR (Double Data Rate) controller (DDR memory controller). The DDR controller accesses a DDR memory (not shown schematically) coupled to the external part of the microcomputer 1 by utilizing both the rise and fall (rise edge and fall edge) of a clock signal. With such access, it is possible to double the processing efficiency per unit time compared to the case where only one of them is utilized, and therefore, it is possible to make an attempt to increase the rate of data transfer between the CPUs 10, 11, 12 and a DDR memory, not shown schematically. The IP module 22 functions as a PCI express (PCIe), which is, for example, an I/O serial interface (one kind of an extension bus). Although not limited in particular, the IP module 23 functions as an MPEG video decoder to decode an MPEG video. Like the CPUs 10, 11, 12 described above, the IP modules 20, 22, 23 each have a function to generate a transfer request for the bus 25. Like the CPUs 10, 11, 12 described above, the IP modules 20, 22, 23 are provided with process ID registers 201, 221, 231, respectively, as a storage unit to store process identification information (referred to as "process ID"). The IP module 21 is a DDR controller and does not issue a transfer request for the bus 25 by itself, and therefore, it is not provided with the process ID register. The CPUs 10, 11, 12 set a process ID corresponding to a process for the process ID registers 201, 221, 231 within the IP modules 20, 22, 23 used to perform the process before activating the process.

Although not limited in particular, the bus 25 can be a split transaction type bus. The CPUs 10, 11, 12 and the IP modules 20, 21, 22, 23 coupled to the bus 25 comprise a master port and a slave port independently. For example, a transfer request of read/write from the CPUs 10, 11, 12 is issued from the master port as a command packet. After arbitrated by a bus arbiter 26, the transfer request is notified to the slave port as a transfer request and bus transaction is executed. It is possible for the split transaction type bus 25 to perform transfer between any combination of all the CPUs and all the function modules coupled thereto. For example, it is possible to perform, for example, transfer between the CPU 10 and the IP module 20, transfer between the CPU 11 and the IP module 21, and transfer between the CPU 12 and the IP module 22 in a parallel manner.

With the split transaction type bus 25, it is possible for each of the CPUs 10, 11, 12 and the IP modules 20, 21, 22, 23 to supply the process ID in units of transactions of the bus 25 to the bus arbiter 26 as a sideband signal.

Figure 9:
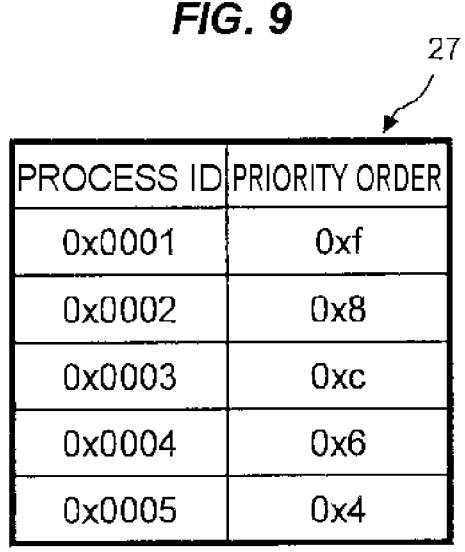
FIG. 9 is an explanatory diagram of a configuration example of a table in the microcomputer shown in FIG. 1.

The bus arbiter 26 arbitrates contention of transfer requests according to a predetermined priority order. Further, the bus arbiter 26 determines the priority order of the use of the bus based on the process ID transmitted in units of transactions of the bus 25 from each of the CPUs 10, 11, 12 and the IP modules 20, 21, 22, 23. A table 27 is referred to when the priority order is determined. In the table 27, for example, as shown in FIG. 9, the process ID and the priority order of the use of the bus are associated. For example, exceptional processing is performed in the CPU 10 corresponding to an input by HMI and the table 27 can be rewritten by the exceptional processing. By rewriting the table 27, it is possible to change the priority order of the use of the bus for the process ID. It is also possible to design a configuration in which the table 27 is rewritten when a predetermined process is started or completed in the CPU 10. It is recommended to constitute the table 27 by a register in order to make an attempt to increase the speed of the table reference by the bus arbiter 26. When the CPU 10 and the table 27 are coupled by a bus lower in speed than the bus 25, it is possible to rewrite the table 27 via the low-speed bus, and therefore, it is not necessary to use the bus 25 to rewrite the table 27.

It is also possible to allocate the same process ID to function module and CPU that operate on a certain application, and therefore, it is made possible to set the same priority order for a function module and CPU necessary for the operation in the same application.

FIG. 2 shows signals exchanged between the CPU 20 and the bus 25.

To the CPU 10 and the bus 25, a common clock signal clk is transmitted. When a request signal (request) is asserted by the CPU 10, in a cycle in which a grant signal (grant) from the bus 25 is asserted, a command (command), source ID (source_id), process ID (process_id), address (address) are issued almost simultaneously. In the write transaction, write data (write_data) is also loaded on the bus 25 (output to the bus) in the above-mentioned cycle. In the read transaction, when data according to the command (command), address (address) in the above-mentioned cycle is prepared, the bus 25 asserts a valid signal, read_data_valid, and loads read data (read_data) on the bus 25. In the example shown in FIG. 2, signals exchanged between the CPU 10 and the bus 25 are shown, however, the same signals are also delivered between other CPUs and function modules that make a transfer request to the bus 25. In this example, when a process ID is transmitted, the bus arbiter 26 determines for which CPU or function module a grant signal (grant) is asserted by referring to the table 27. That is, when a process ID is transmitted, the bus arbiter 26 refers to the table 27 and determines a priority order corresponding thereto. When there is contention of transfer requests, a grant signal (grant) is asserted for a CPU or function module corresponding to the process ID with the highest priority order at that time. Due to this, arbitration according to a predetermined priority corresponding to a process ID transmitted from a CPU or function module is performed.

FIG. 8 shows a setting example of the process ID setting registers 101, 111, 201, 221. Registers to set a process ID are prepared in the number corresponding to the number of processes that operate in a parallel manner for each IP module or CPU. This example shows that the CPUs 10, 11 and the IP module 21 perform two processes (0x0001, 0x0002 or 0x0001, 0x0003), respectively, in a parallel manner.

Figure 7:
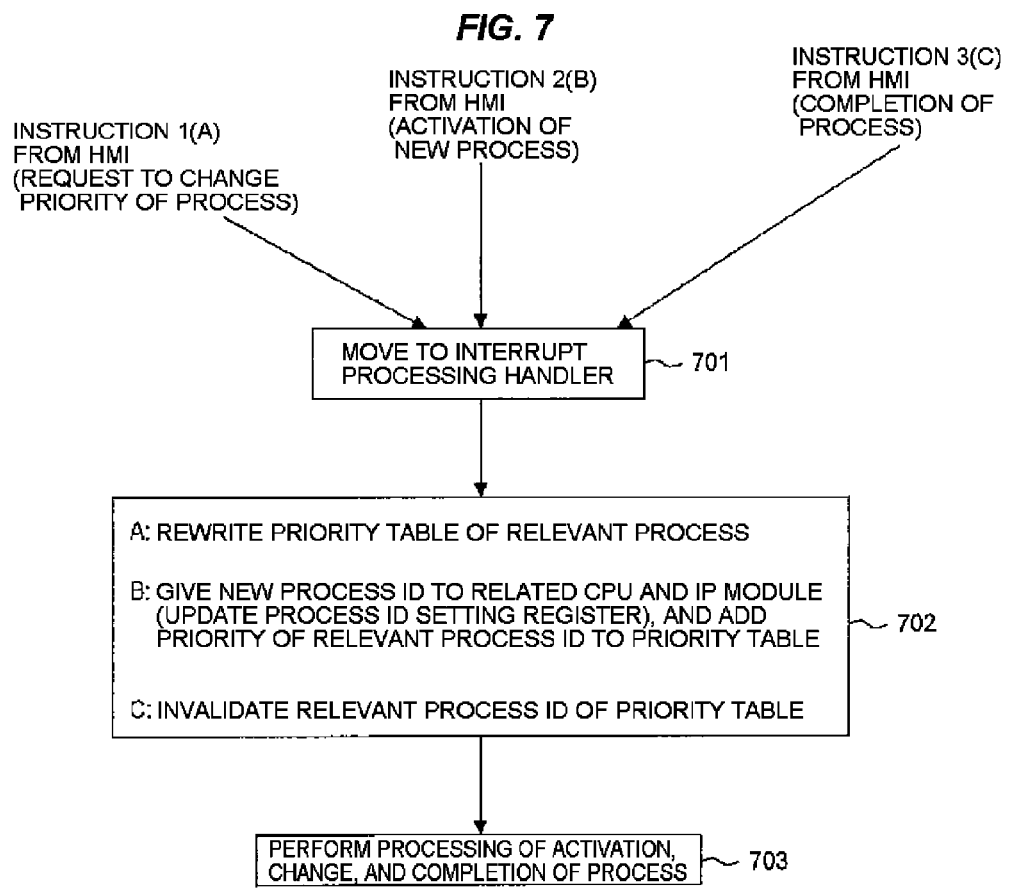
FIG. 7 is a flowchart showing a flow of setting of a process ID in the microcomputer shown in FIG. 1.

FIG. 7 shows a flow of the setting of process ID to the process ID setting register.

In this example, as an instruction 1 (A) from HMI, mention is made of a request to change the process priority. This instruction includes, for example, a case where a user clicks one of a plurality of windows on a screen to display the window at the uppermost position. As an instruction 2 (B) from HMI, mention is made of activation of a new process. This instruction includes, for example, a case where a user activates a new application. Further, as an instruction 3 (C) from HMI, mention is made of completion of a process in activation.

Each instruction is notified to the microcomputer 1 as an interrupt signal via the serial interface 24. For example, an OS executed by the CPU 10 switches to an interrupt processing handler upon receipt of the interrupt signal (701). The interrupt handler performs the following processing.

In the case of a request to change the process priority from HMI, the priority table of the process is rewritten (702). In the case of a request to activate a new process from HMI, a new process ID is given to a related CPU and IP module, the process ID setting register is updated, and the priority of the process ID is added to the table 27 (702). In the case of a request to complete the process in activation from HMI, the relevant process ID in the priority table is invalidated (702). After the above, the processing of activation, change, and completion of the process is performed as in the conventional system (703).

Next, the working of the above-mentioned configuration is explained based on FIGS. 3 to 5. In FIGS. 3 to 5, the horizontal axis represents time. A numerical value described as in process 1, process 2, etc., represents a process ID. The process 1 and the process 2 in this case mean different applications, respectively. A numerical value within square brackets described as "1", "2", etc., represents a priority order.

In FIG. 3, a relationship between the CPU 10 and the IP module 21 (DDR controller) in FIG. 1 is shown.

First, as an object to be compared with the case where the priority order is set in units of processes, a case is explained where the priority order is set in units of CPU and IP module. For example, when it is assumed that the priority order of the CPU 10 is set higher than that of the IP module 21 and the relationship of the priority order is fixed, the process 2 in the CPU 10 obtains with priority the right of the use of the bus 25 at the time of execution of the IP module 21 (times t1, t2) as shown in FIG. 3(A), and therefore, the processing of the process 1 by the IP module 21 is kept waiting and the processing performance is reduced as a result.

Next, the case where the priority order is set in units of processes is explained.

In the configuration shown in FIG. 1, for example, when the table 27 is set so that the priority order of the process 1 is the highest and the contention of transfer requests is arbitrated according to the table 27, the result will be as shown in FIG. 3(B). That is, the processing of the process 2 in the CPU 10 is delayed compared to the case in FIG. 3(A), however, processing is completed within the processing time of the process 1 in the IP module 21 and the total processing time is reduced, and therefore, the total processing performance is improved compared to the case in FIG. 3(A).

It can be thought to change the priority in units of interrupts, however, in such a case, each time an interrupt request occurs, it is necessary to confirm the priority order of all the IP modules running at that time, and therefore, the processing overhead becomes large and not practical.

FIG. 4 shows a relationship between the CPU 10, the IP module 21 (DDR controller), and the IP module 22 (PCI express) in FIG. 1.

First, as an object to be compared with the case where the priority order is set in units of processes, a case is explained where the priority order is set in units of CPU or IP module with reference to FIG. 4(A). For example, when the process 1 and the process 2 are running in a multithread manner in the CPU 10 and the same priority order 1 is set to the process 1 and the process 2, the processing time of both is equal to each other. As a result, in the operation of the CPU 10 and the IP module 21 for the process 1, there occur wait cycles C1, C2, C3, C4 in the IP module 21 by the processing of the process 2 by the CPU 10 and the processing performance of the process 1 deteriorates.

Next, the case where the priority order is set in units of processes is explained.

In the configuration shown in FIG. 1, for example, when the table 27 is set so that the priority order of the process 1 is the highest and the contention of transfer requests is arbitrated according to the table 27, the result will be as shown in FIG. 4(B). That is, the priority 2 of the process 2 of the CPU 10 is lower than the priority 1 of the process 1 of the IP module 21, and therefore, it is possible to complete the processing of the IP module 21 at the highest speed and as a result, the real-time properties of the process are secured and the total processing performance is improved compared to the case in FIG. 4(A). Further, the process 2 is controlled by the processing performance of the IP module 22, and therefore, the performance does not deteriorate also in this case.

FIG. 5 shows a relationship between the CPUs 10, 11, the IP module 21 (DDR controller), the IP module 22 (PCI express), and the IP module 23 (MPEG video decoder) in FIG. 1.

First, as an object to be compared with the case where the priority order is set in units of processes, a case is explained where the priority order is set in units of CPU and IP module 21 with reference to FIG. 5(A). After the process 1 of the IP module 21 is started, the process 1 of the CPU 10 is started and after that, the process 1 of the IP module 22 is started and after that, the process 2 of the CPU 11 and the process 2 of the IP module 23 are started. After the process 2 is started, the priority orders 3, 4 become bottlenecks in the process 1 and in the process 2, the priority order 4 becomes a bottleneck and desired performance is not obtained for the process 1 or the process 2. To solve such a state, it is necessary to confirm the priority order of all the running IP modules and CPUs and their relationship when the process 2 is started.

Next, the case where the priority order is set in units of processes is explained with reference to FIG. 5(B).

For the CPU 10, the IP modules 21, 22, the contention of transfer requests is arbitrated with the same priority order 1. Similarly, for the CPU 11 and the IP module 23, the contention of transfer requests is arbitrated with the same priority order 2. As a result, the performance of the process 1 is considerably improved compared to the case in FIG. 5(A). In this example, in the process 2, the CPU 1 is originally a bottleneck, and therefore, there is no deterioration in performance.

Second Embodiment

Figure 6:
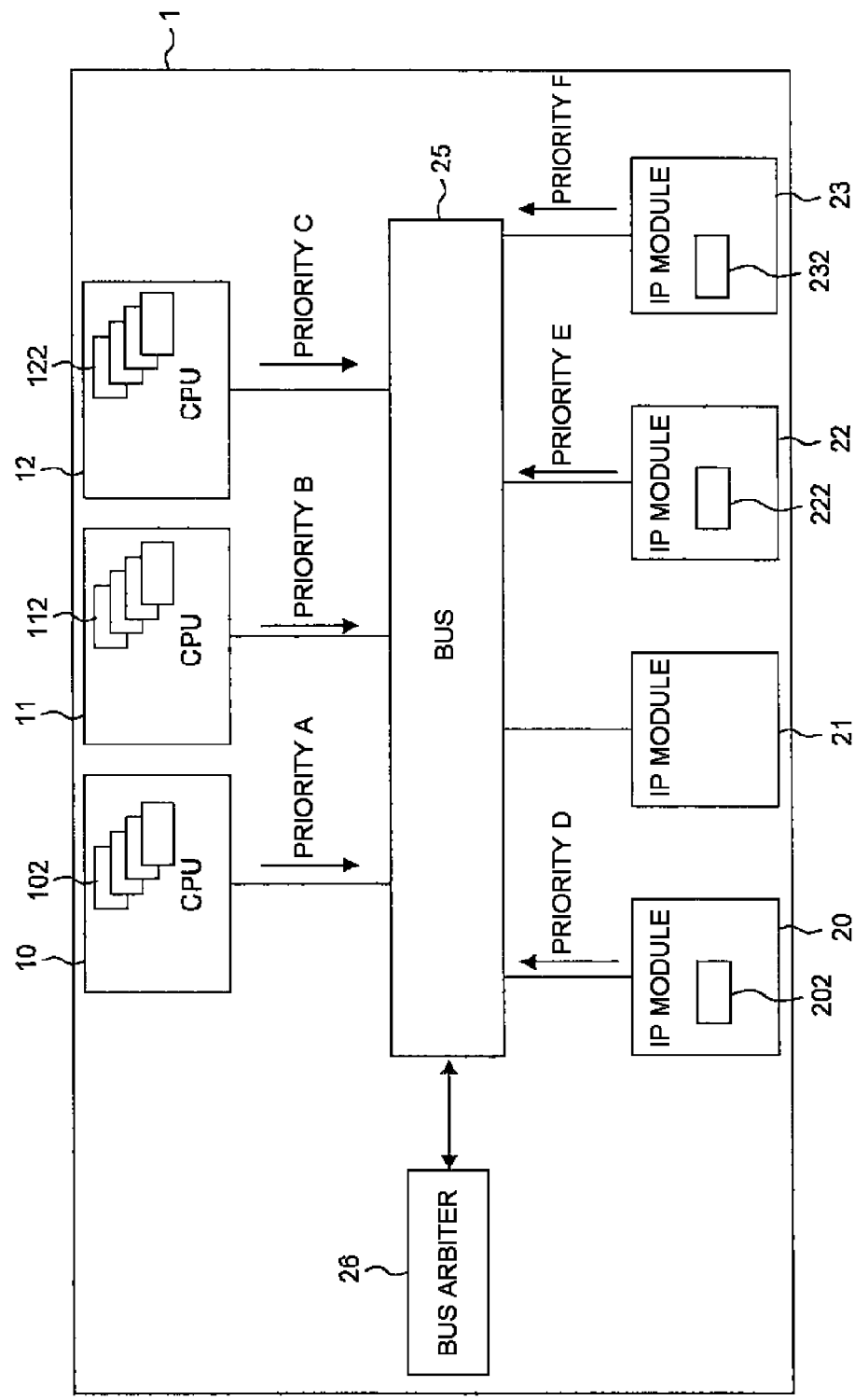
FIG. 6 is a block diagram of another configuration example of a microcomputer regarded as an example of an information processing device according to the present invention.

FIG. 6 shows another configuration example of a microcomputer regarded as an example of an information processing device according to the present invention.

The microcomputer 1 shown in FIG. 6 differs considerably from that shown in FIG. 1 in that process-correspondent priority setting registers 102, 112, 122, 202, 222, 232 are provided instead of the process ID setting registers 101, 111, 121, 201, 221, 231 in the CPUs 10, 11, 12 and the IP modules 20, 22, 23. Because the process-correspondent priority setting registers 102, 112, 122, 202, 222, 232 are provided, that which corresponds to the table 27 in FIG. 1 is no longer necessary. In the process-correspondent priority setting registers 102, 112, 122, 202, 222, 232, process-correspondent priority information (A to F) is set. Then, the priority information can be changed for each process to correspond to a process. Each of the CPUs 10, 11, 12 and the IP modules 20, 21, 22, 23 provides the process-correspondent priority information (A to F) in units of transactions of the bus 25 to the bus arbiter 26 via, for example, a sideband signal line of the bus. The timing of various signals exchanged between the CPU and the bus is the same as that in the case shown in FIG. 2. In this example, however, priority information is transmitted to the bus arbiter 26 instead of process ID. The bus arbiter 26 arbitrates contention of transfer requests based on the priority information (A to F).

These priority setting registers 102, 112, 122, 202, 222, 232 are managed by the OS and in the storage region managed by the OS, priority order information (management table) of the process and each IP corresponding thereto is stored and each time the process changes, the OS rewrites the register using the management table.

In the configuration shown in FIG. 6, when a process runs newly, it is necessary to set a process-correspondent priority register of the related IP module and CPU. After that, the resetting of the register is not necessary until the process is completed.

The configuration shown in FIG. 6 is also a configuration in which priority changes dynamically in units of processes in the multiprocess-correspondent (the same meaning as the multithread-correspondent) IP module and CPU and it is made possible to control the bus priority in units of processes. With such a configuration, it is possible to obtain the same working effect as that in the case of the configuration shown in FIG. 1.

The invention made by the inventors of the present invention is explained specifically based on the embodiments, however, it is needless to say that the present invention is not limited to those and there can be various modifications in the scope not deviating from its gist.

For example, the configuration is not limited to that in which, for example, the process ID registers 101, 111, 121, 201, 221, 231 are arranged within each module shown in FIG. 1. For example, a table capable of holding a process ID set for each process in association with a source ID of a function module that performs processing of the process is provided in the router of the split transaction type bus 25 as a process identification information holding unit. In this case, when a data transfer request occurs from the function module, the table is referred to in the router, a process ID corresponding to the source ID of the function module in relation to the data transfer request is found, and it is transmitted to the bus arbiter 26. The processing in the bus arbiter 26 is the same as that in the configuration shown in FIG. 1.

Further, the configuration is not limited to that in which the priority setting registers 102, 112, 122, 202, 222, 232 are arranged within each function module in FIG. 6. For example, a table capable of holding priority information set for each process in association with a source ID of a function module that performs processing of the process is provided in the router of the split transaction type bus 25 as a priority information holding unit. In this case, when a data transfer request occurs from the function module, the table is referred to in the router and priority information corresponding to the source ID of the function module in relation to the data transfer request is transmitted to the bus arbiter 26. The processing in the bus arbiter 26 is the same as that in the configuration shown in FIG. 6.

With the configurations described above, it is possible to obtain the same effects as those in the first and second embodiments. In the configurations in the first and second embodiments, the reference to the table in the router to obtain a process ID and priority information is not necessary, and therefore, it is possible to make an attempt to reduce the time required to complete arbitration.

The number of IP modules is not limited to that in the cases shown in FIG. 1 and FIG. 6. Further, the bus 25 is not limited to a split transaction type bus and a bus is accepted in which, for example, a bus master occupies the bus and performs data transfer.

The microcomputer 1 described above can be applied widely to products, such as mobile telephones and digital home appliances, which require multimedia processing of image and voice, and products that require real-time processing used for voice/image recognition, artificial intelligence/robots, etc., and in which a number of CPUs and IP modules are integrated. For example, for the application such as mobile digital broadcasting, as an SoC, it is necessary for CPU and various IP modules to operate in cooperation with one another and the microcomputer 1 described above can be applied to such a use. Further, in addition to the above, the bus priority control between CPUs in a multi-CPU becomes very complicated together with the dynamic allocation of process in the SMP (Symmetric Multi Processing) operation and the microcomputer 1 described above is also suitable for such a use. Furthermore, the recent multimedia system SoC is becoming a memory bus neck and in order to realize an operation that does not cause stress in a user, the bus priority control in units of processes is effective for an HMI based request.

What is claimed is:

1. An information processing device comprising:
   a bus for data transfer;
   a plurality of function modules each having a processing function performing processing in units of processes and capable of issuing data transfer request for the bus;
   a plurality of process identification information holding units capable of holding process identification information set for each process in association with the function module performing processing of the process;
   a bus arbiter determining a priority order of processing for each piece of the corresponding process identification information and arbitrating contention of data transfer requests for the bus according to the priority order; and
   a table in which the process identification information and the priority order are associated,
   wherein the function modules each include a CPU and the CPU sets process identification information correspond to a process in the process identification information holding unit corresponding to the function module used for processing of the process before activating the process,
   wherein each process identification information holding unit is a register arranged within the corresponding function module,
   wherein the bus arbiter refers to the table and determines a priority order of processing for each piece of the process identification information,
   wherein stored information can be updated in the table, and
   wherein stored contents of the table are updated according to an external input.

2. The information processing device according to claim 1, wherein the bus is a split transaction type bus, and
   wherein the process identification information is supplied to the bus arbiter by a sideband signal of the bus in a cycle in which a grant signal for the data transfer request from the function module is asserted.

3. An information processing device comprising:
   a bus for data transfer;
   a plurality of function modules each having a processing function performing processing in units of processes and capable of issuing a data transfer request for the bus;
   a plurality of priority information holding units capable of holding priority information set for each process in association with the function module performing processing of the process; and
   a bus arbiter arbitrating contention of data transfer requests for the bus according to the priority order based on the corresponding priority information for each data transfer request from the function module,
   wherein the function modules each include a CPU and the CPU sets priority information corresponding to a process in the priority information holding unit corresponding to the function module used for processing of the process before activating the process,
   wherein each priority information holding unit is a register arranged within the corresponding function module,
   wherein the bus is a split transaction type bus, and
   wherein the priority information is supplied to the bus arbiter by a sideband signal of the bus in a cycle in which a grant signal for the data transfer request from the function module is asserted.

* * * * *